United States Patent [19]

Steele

[11] 3,724,272
[45] Apr. 3, 1973

[54] SELF-SUPPORTING FUSIBLE PYROMETRIC DEVICE

[75] Inventor: Richard F. Steele, Columbus, Ohio

[73] Assignee: The Oton, Edward, Jr., Ceramic Foundation, Columbus, Ohio

[22] Filed: Dec. 10, 1970

[21] Appl. No.: 96,934

[52] U.S. Cl....................................73/358, 116/114.5
[51] Int. Cl.............................................G01k 11/08
[58] Field of Search..............73/358; 116/106, 114.5

[56] References Cited

UNITED STATES PATENTS

| | | | |
|---|---|---|---|
| 2,129,912 | 9/1938 | CoVan | 73/358 |
| 3,533,291 | 10/1970 | Steele | 73/358 |
| 2,274,343 | 2/1942 | Orth | 73/358 |
| 3,541,856 | 11/1970 | Steele | 73/358 |
| 2,181,618 | 11/1939 | Bole | 25/90 |
| 2,181,619 | 11/1939 | CoVan | 25/90 |

Primary Examiner—Richard C. Queisser
Assistant Examiner—Denis E. Corr
Attorney—Birch, Swindler, McKie & Beckett

[57] ABSTRACT

A pyrometric device which measures the amount of heat applied during a heat treatment process. The device fuses and deforms during a heat treatment process to provide a visual indication of the amount of heat applied. The center of mass of the device remains at all times directly above the bottom surface thereof so that the device is self-supporting and requires no external support either before, during or after deformation.

9 Claims, 10 Drawing Figures

PATENTED APR 3 1973  3,724,272

INVENTOR
RICHARD E. STEELE

BY Birch, Swindler,
McKie & Beckett

ATTORNEYS

SELF-SUPPORTING FUSIBLE PYROMETRIC DEVICE

BACKGROUND OF THE INVENTION

1. Field of the Invention

This invention relates to fusible pyrometric devices for measuring the amount of heat applied during heat treatment processes, and specifically, to a fusible pyrometric device which performs the same function as that performed by a pyrometric cone.

2. Description of the Prior Art

Pyrometric cones have long been used for measuring the amount of heat applied during heat treatment processes, such as the firing of ceramic ware in a kiln. Such cones are made from different selected ceramic materials, and depending upon the composition thereof, fuse and deform when subjected to a predetermined amount of heat. Generally, the cones are shaped as elongated, truncated, triangular pyramids as shown, for example, in Co Van et al U.S. Pat. Nos. 2,129,912 and 2,181,619, Bole et al. U.S. Pat. No. 2,181,618 and Orth et al. U.S. Pat. No. 2,274,343, and are disposed in an upright position for use during a heat treatment process so that the cones will deform by bending downwardly. This deformation provides a visual indication of the amount of heat applied during the process.

One of the principal advantages of pyrometric cones is their sensitivity not only to temperature, but to time of exposure as well. For example, the temperature at which cones of a particular composition deform generally increases as the rate of heating is increased, and the exposure time thus decreased. The combined effects of temperature and time of heating are referred to generally as the amount of heat applied. Since ceramic ware also is sensitive to the amount of heat applied, pyrometric cones have been widely adopted for measuring the amount of heat applied to such ware during firing.

The prior art pyrometric cones all have required external means for supporting the cones in the proper upright position for use during a heat treatment process. Such external supporting means generally comprises a plaque on which the cones are mounted by the engagement of the lower ends of the cones with slots or grooves formed in the upper surface of the plaque. The prior art methods of supporting pyrometric cones, including the use of plaques, are not entirely satisfactory because such methods invariably introduce variations in cone positioning unless the necessary care and skill are exercised to position the cones properly. Variations in cone positioning obviously produce variations in cone deformation characteristics, and therefore inconsistencies in cone performance. The most common cone positioning variations are differences in effective cone height and angle of inclination.

The effective height of a pyrometric cone and other similar devices, as used herein, is defined as the vertical distance between the edge about which the device bends upon heat-induced deformation and a horizontal plane which includes the geometric center of the upper surface of the device when the device is disposed in an upright position for use. The angle of inclination of a pyrometric cone and other similar devices, as used herein, is defined as the angle between the longitudinal axis of the portion of the device which is adapted to bend upon heat-induced deformation and a horizontal line extending through the intersection of such axis and the bottom surface of the device in the desired direction of bending when the device is in an upright position for use.

Another common problem with the prior art methods of supporting pyrometric cones is caused by differences in the composition of the cone being supported and the supporting means therefor, such as a plaque. Due to such differences the heat-induced shrinkage characteristics of the cone and supporting means may be different. If the shrinkage of the cone is greater than the shrinkage of the supporting means, the cone may become loose, thereby changing the effective height and angle of inclination of the cone during heating. If the shrinkage of the cone is less than the shrinkage of the supporting means, the supporting means may apply stresses to the lower end of the cone during heating which will influence the deformation characteristics of the cone adversely.

An improved method of supporting pyrometric cones which largely eliminates the foregoing problems is taught in U.S. Pat. No. 3,533,291, owned by the assignee of the present application. Such method, however, employs external cone supporting means on which the cones are mounted by the manufacturer of the supporting means. This method thus involves the cost of the labor required to mount the cones on the supporting means.

SUMMARY OF THE INVENTION

The fusible pyrometric device of the present invention obviates the above-mentioned cone positioning difficulties and may be produced relatively inexpensively. Basically described, the device of the invention comprises a lower base portion and an upper bending portion integral with the base portion, said base portion defining a bottom surface upon which the device is adapted to rest, the longitudinal axis of said bending portion being inclined from the vertical when the device is resting on the bottom surface so that when the device is subjected to a predetermined amount of heat, the bending portion will fuse and deform by bending downwardly, and the center of mass of the device being located such that when the device is resting on the bottom surface, a line extending vertically downwardly from the center of mass intersects the bottom surface before, during and after deformation of the bending portion.

The center of mass of the device thus remains at all times directly above the bottom surface so that the device will be self-supporting and requires no external support either before, during or after deformation. Consequently, no external supporting means, such as the prior art plaques, are required to support the device for use during a heat treatment process.

Moreover, since no external means are required to support the device, the above-described cone positioning problems, which are an inherent difficulty with such means, are eliminated. The device may be positioned easily and consistently in the proper position for use merely by placing the bottom surface thereof on a planar supporting surface, such as a kiln shelf.

Accordingly, it is an object of the present invention to provide a self-supporting fusible pyrometric device for measuring the amount of heat applied during a heat treatment process.

It is another object of the invention to provide a fusible pyrometric device as described in the preceding object, which device requires no external supporting means to position it for use during a heat treatment process.

It is a further object of the invention to provide a fusible pyrometric device which is adapted to be positioned easily and consistently in the proper position for measuring the amount of heat applied during a heat treatment process.

These and other objects of the invention will become apparent upon a consideration of the following detailed description of the preferred embodiments thereof given in connection with the following drawings.

DESCRIPTION OF THE PREFERRED EMBODIMENTS

Figure 1:
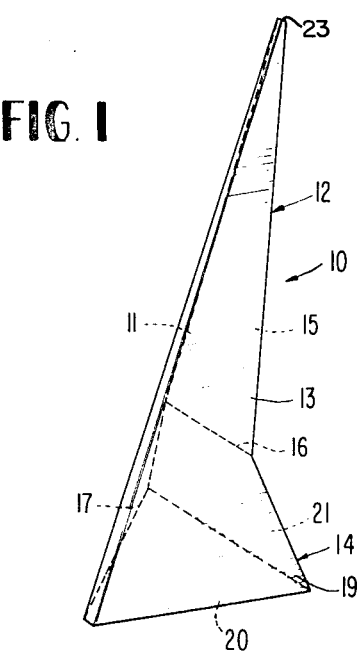
FIG. 1 is a perspective view of a first embodiment of the device of the invention.
Figure 2:
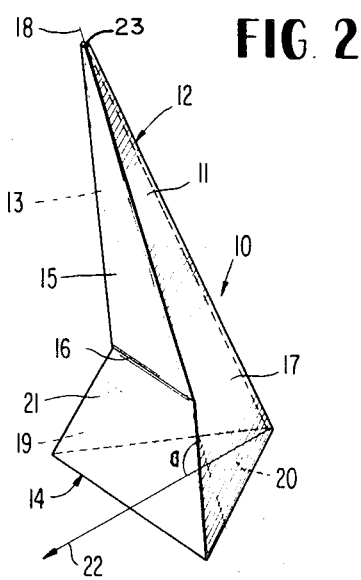
FIG. 2 is another perspective view of the embodiment shown in FIG. 1, as seen from a position offset 180° with respect to the position from which the view of FIG. 1 is seen.

A first embodiment of the fusible pyrometric device of the invention is shown in FIGS. 1-6, as designated by reference numeral 10. Device 10 comprises an upper bending portion 12 and a lower base portion 14 integral with upper portion 12. Portion 12 is shaped as a truncated triangular pyramid having side surfaces 11, 13 and 15 and a top surface 23. Portion 14 also is shaped as a truncated triangular pyramid having side surfaces 17, 19 and 21. Bending portion 12 is more elongated than base portion 14, with side surfaces 11 and 13 being coplanar with side surfaces 17 and 19, respectively. Portions 12 and 14 are joined at the transverse cross-section of device 10 which includes an edge 16 defined by the intersection of side surfaces 15 and 21.

Base portion 14 also has a bottom surface 20 upon which device 10 is adapted to rest when the device is positioned for use during a heat treatment process. Surface 20 is adapted to be placed on a planar supporting surface, such as a kiln shelf.

Figure 5:
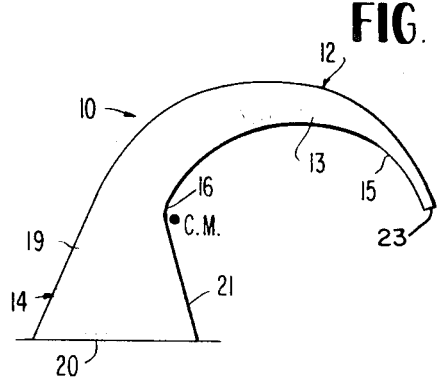
FIG. 5 is an elevational view of the embodiment shown in FIG. 1, showing the manner in which the device deforms by bending downwardly during a heat treatment process.
Figure 4:
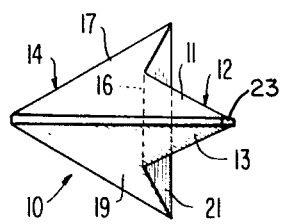
FIG. 4 is a plan view of the embodiment shown in FIG. 1.
Figure 6:
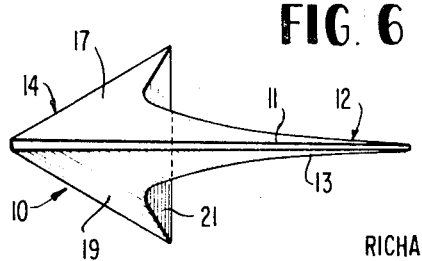
FIG. 6 is a plan view of the embodiment shown in FIG. 1, also showing the manner in which the device deforms by bending downwardly during a heat treatment process.

The longitudinal axis 18 of bending portion 12, which axis extends through the geometric centers of the top and bottom surfaces of portion 12, is inclined from the vertical when device 10 is positioned in an upright position for use. Due to the inclination of axis 18, when bending portion 12 fuses sufficiently during heating, such portion will deform by bending downwardly over edge 16, as shown in FIGS. 5 and 6. Side surface 15 of portion 12, which with side surface 21 of portion 14 defines edge 16, conveniently is referred to as the bending face of device 10, although all regions of portion 12 are deformed during heating by varying amounts.

Figure 3:
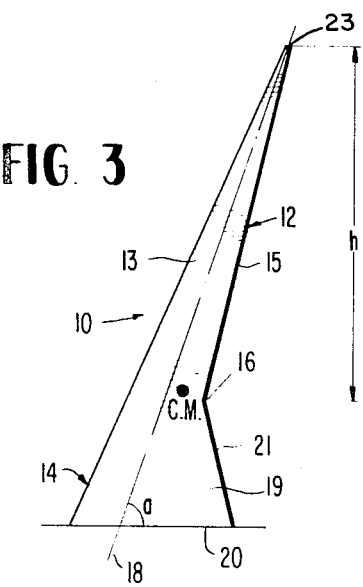
FIG. 3 is an elevational view of the embodiment shown in FIG. 1.

The effective height of device 10 is the vertical distance between edge 16 and a horizontal plane which includes the geometric center of top surface 23 of portion 12 when device 10 is positioned for use; such height being designated by the dimension $h$ in FIG. 3. The angle of inclination of bending portion 12 is the angle between the longitudinal axis 18 and a line 22 which extends through the intersection of axis 18 and bottom surface 20 in the desired direction of bending of portion 12 when device 10 is positioned for use; such angle being designated by the letter $a$ in FIGS. 2 and 3.

Before deformation, the center of mass of device 10, designated C.M., is directly above bottom surface 20, as shown in FIG. 3. Similarly, after deformation, center of mass C.M. also is directly above surface 20, as shown in FIG. 5. During deformation center of mass C.M. moves from the position shown in FIG. 3 to the position shown in FIG. 5. Thus, center of mass C.M. is located such that a line extending vertically downwardly therefrom will intersect bottom surface 20 for all normal positions of bending of portion 12. Consequently, device 10 is self-supporting and will not fall over either before, during or after deformation.

Portions 12 and 14 of device 10 may be formed substantially simultaneously as an integral one-piece unit by pressing a plastic mixture of the selected ceramic materials from which the device is made into the desired shape. Also, the device may be formed by compacting relatively dry granular particles of such materials, as taught in U.S. Pat. No. 3,541,856, owned by the assignee of the present application.

Figure 7:
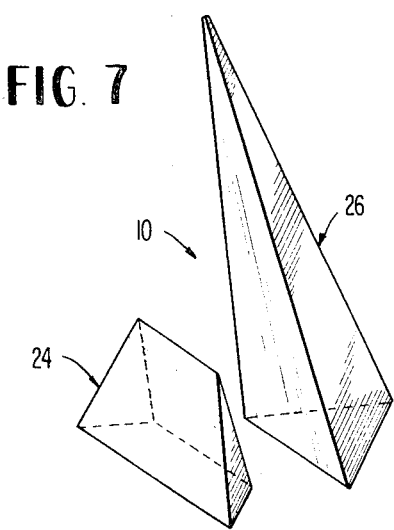
FIG. 7 is an exploded view of the embodiment shown in FIG. 1, showing one manner in which the device may be formed.

Alternatively, device 10 may be formed by attaching an apron 24 to the lower end of the bending face of a conventional pyrometric cone 26, as shown in FIG. 7. Apron 24 is illustrated as wedge-shaped, but the apron could be shaped as a triangular or rectangular prism, a partial cylinder, or other polyhedron. Apron 24 is attached to cone 26 with a suitable adhesive and may have the same or a different composition than the cone.

Figure 8:
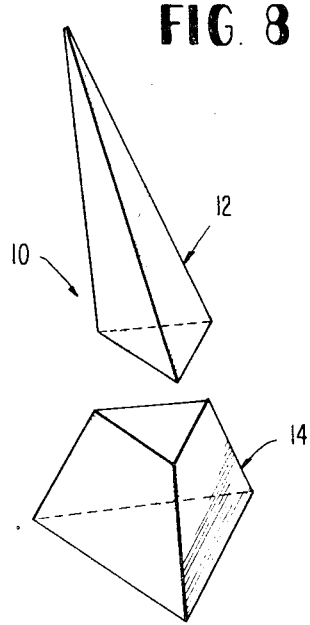
FIG. 8 is another exploded view of the embodiment shown in FIG. 1, showing another manner in which the device may be formed.

As a further alternative, device 10 may be formed by making portions 12 and 14 separately and then joining the portions, as shown in FIG. 8. The portions are joined by a suitable adhesive and may have the same or different compositions.

Figure 9:
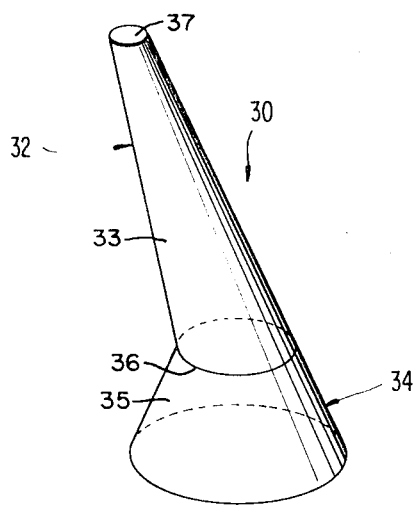
FIG. 9 is a perspective view of a second embodiment of the device of the invention.

Bending portion 12 and base portion 14 have been described as being shaped as truncated triangular pyramids. However, the base and bending portions of device 10 may have other shapes, for example, truncated rectangular pyramids or truncated cones. The latter embodiment is shown in FIG. 9, as designated by reference numeral 30. Device 30 comprises an upper bending portion 32 having a side surface 33 and a top surface 37, and a lower base portion 34 having a side surface 35. Surfaces 33 and 35 intersect and define an edge 36 about which portion 32 bends upon heat-induced deformation. Also, the bending and base portions may have different shapes, for example, the bending portion may be shaped as a parallelepiped and the base portion as a truncated rectangular pyramid. Further, none of the side surfaces of the bending portion need to be coplanar with the side surfaces of the base portion.

Figure 10:
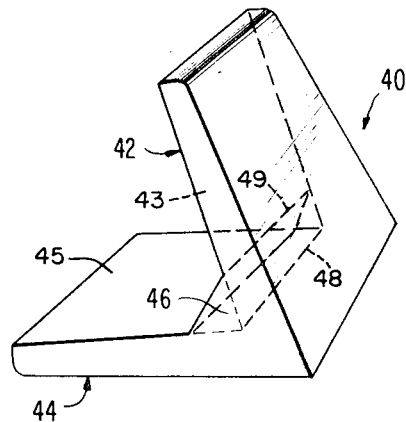
FIG. 10 is a perspective view of a third embodiment of the device of the invention.

A further and slightly different embodiment of the device of the invention is shown in FIG. 10, as designated by reference number 40. Device 40 comprises a first portion 42 and a second portion 44. Portions 42 and 44 are shaped as identical truncated rectangular pyramids and are joined at their bases. Bending portion 42 and base portion 44 have respective side surfaces 43 and 45 which intersect and define an edge 48 about which bending portion 42 bends. A fillet 46 may be interposed between portions 42 and 44 adjacent the juncture between the portions to strengthen the device. The intersection of the fillet and side surface 43 defines an edge 49 about which bending portion 42 bends.

Device 40 may be positioned with either portion 42 or portion 44 as the upper bending portion and the other portion as the lower base portion. One advantage of device 40 is that the base portion, being of the same longitudinal dimension as the bending portion, will prevent the bending portion from contacting and sticking to a supporting surface when the bending portion bends downwardly. Also, the transverse dimension of device 40 is uniform along each transverse cross-section thereof, so that the device may be formed as an integral unit by extrusion, as well as by the pressing and compacting methods mentioned above.

For all embodiments of the device of the invention, the bottom surface of the base portion may be coated with a high refractory material to prevent the base portion from sticking to the supporting surface upon which the device is placed for use during a heat treatment process. However, the shelves of many kilns are themselves coated with such a material, rendering such a coating on the bottom surface of the base portion unnecessary.

As will be apparent, the self-supporting characteristic of the device of the invention eliminates any necessity for using an external supporting means to position the device properly for use during a heat treatment process. The above-mentioned cone positioning difficulties associated with such supporting means thus also are eliminated. The device is adapted to be positioned for use easily with the effective height and angle of inclination being uniform for all similar devices having the same shape and dimensions. Therefore, the deformation characteristics of the device are consistent.

Also, since the base portion of the device is not enclosed by any external supporting means, no stresses are applied to the device during heating which might adversely affect its deformation characteristics.

While the foregoing constitutes a detailed description of the preferred embodiments of the invention, it is recognized that other embodiments thereof will occur to those skilled. Therefore, the scope of the invention is to be limited solely by the scope of the appended claims.

I claim

1. A fusible pyrometric device comprising a lower base portion and an upper bending portion, said base and bending portions being formed substantially simultaneously as an integral one-piece unit, said base portion defining a bottom surface, the longitudinal axis of said bending portion being inclined from the vertical when said bottom surface is oriented horizontally so that when the device is subjected to a predetermined amount of heat, said bending portion will fuse and deform by bending downwardly, said base and bending portions also defining respective side surfaces, said side surfaces intersecting and defining an edge about which said bending portion bends downwardly, the vertical distance between said edge and the geometric center of the upper surface of said bending portion being uniform for each said device of the same shape and dimensions, and the angle between the longitudinal axis of said bending portion and a line in the plane of said bottom surface extending through the intersection of said axis and said bottom surface in the direction of bending of said bending portion also being uniform for each said device of the same shape and dimensions.

2. A device as recited in claim 1, wherein said base and bending portions are shaped as truncated triangular pyramids.

3. A device as recited in claim 1, wherein said base and bending portions are shaped as truncated cones.

4. A device as recited in claim 1, wherein said base and bending portions are polyhedrons having identical shapes and dimensions.

5. A device as recited in claim 1, wherein said bottom surface is coated with a high refractory material.

6. A device as recited in claim 1, wherein the center of mass of the device is located such that when said bottom surface is oriented horizontally, a line extending vertically downwardly from said center of mass intersects said bottom surface before, during and after deformation of said bending portion.

7. A fusible pyrometric device comprising a lower base portion and an upper bending portion integral with said base portion, said base and bending portions being made of the same material and being polyhedrons having identical shapes and dimensions, said base portion defining a bottom surface, the longitudinal axis of said bending portion being inclined from the vertical when said bottom surface is oriented horizontally so that when the device is subjected to a predetermined amount of heat, said bending portion will fuse and deform by bending downwardly, said base and bending portions also defining respective side surfaces, said side surfaces intersecting and defining an edge about which said bending portion bends downwardly, the vertical distance between said edge and the geometric center of the upper surface of said bending portion being uniform for each said device of the same shape and dimensions, and the angle between the longitudinal axis of said bending portion and a line in the plane of said bottom surface extending through the intersection of said axis and said bottom surface in the direction of bending of said bending portion also being uniform for each said device of the same shape and dimensions.

8. A device as recited in claim 7, wherein said base and bending portions are formed substantially simultaneously as an integral one-piece unit.

9. A device as recited in claim 7, wherein the center of mass of the device is located such that when said bottom surface is oriented horizontally, a line extending vertically downwardly from said center of mass intersects said bottom surface before, during and after deformation of said bending portion.

* * * * *